Jan. 25, 1944.                M. SKOLNIK                2,340,208
                    CASKET AND METHOD OF MAKING SAME
                          Filed Nov. 6, 1941
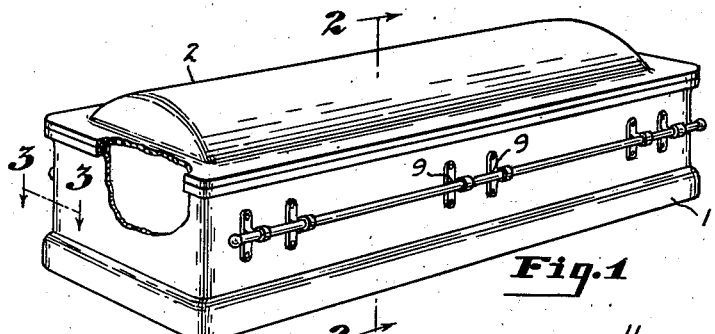
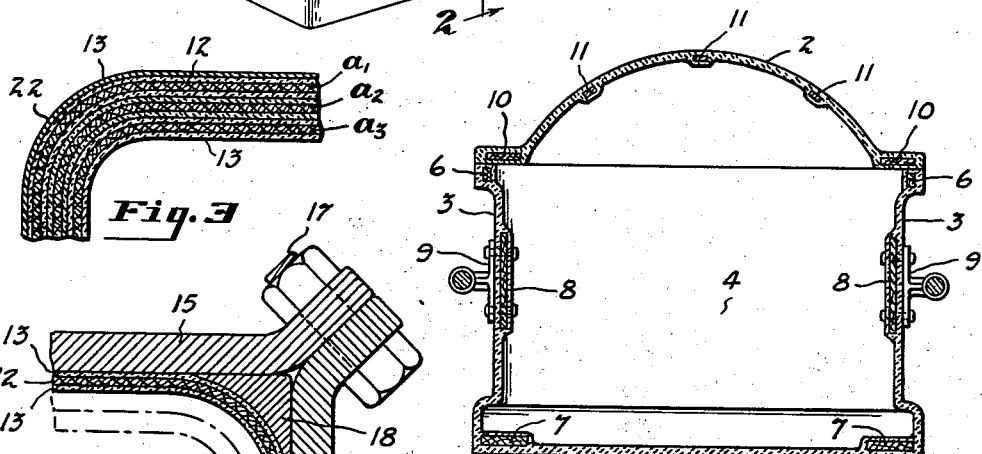
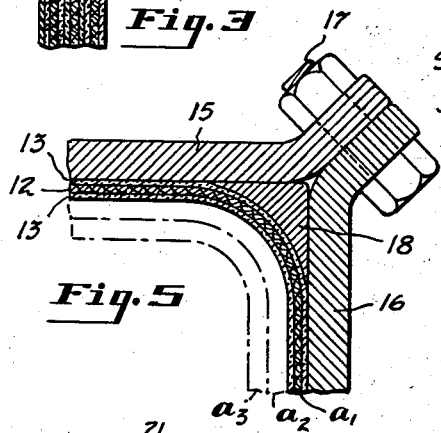
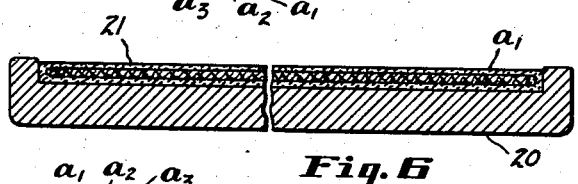
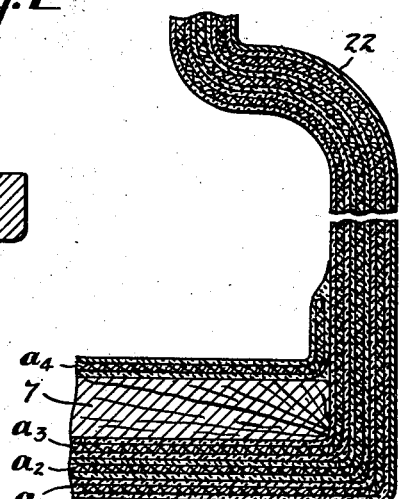
INVENTOR
Max Skolnik
BY Evans + McCoy
ATTORNEYS Patented Jan. 25, 1944

2,340,208

UNITED STATES PATENT OFFICE 2,340,208

CASKET AND METHOD OF MAKING SAME

Max Skolnik, Chicago, Ill.

Application November 6, 1941, Serial No. 418,035

9 Claims. (Cl. 27—3)

This invention relates to burial caskets and to a method of making the same. It also relates to a plastic, fibrous reinforced ply material which may be shaped and allowed to harden to produce articles having high strength and relatively low density.

Heretofore, burial caskets have been made of steel and of wood; both wood and steel are objectionable because they are not permanent, steel at the present time also being objectionable for the reason that it is difficult to obtain.

It is an object of the present invention to provide a light weight, relatively inexpensive casket which is strong and substantially water-resistant, even for long periods of time, and which has a pleasing appearance.

It is another object of the present invention to provide a casket which may be readily assembled as a single unit from readily obtainable plastic material, which is relatively light in weight, strong, and which does not need to contain any appreciable amounts of metal.

It is a further object of the present invention to provide ply material which may be readily formed to any desired shape and which may be used in the form of superimposed layers to produce a unified structure of high strength.

Other objects and advantages of this invention will be apparent from the following detailed description of the invention as illustrated by the accompanying drawing, in which:

Figure 1 is a perspective view, with portions broken away, of a casket embodying the present invention;

Fig. 2 is a sectional view through the casket taken on the line 2—2 of Fig. 1;

Fig. 3 is an enlarged sectional view through a rounded corner taken on the line 3—3 of Fig. 1;

Fig. 4 is an enlarged view of the lower right-hand corner as shown in Fig. 2;

Fig. 5 is a sectional view through a portion of a suitable metal mold, showing an arrangement of the layers of plastic material in forming portions of the casket;

Fig. 6 is a sectional view through a portion of a modified mold which may be used if it is desired to separately form the outer layers of the end panels and side panels of the casket; and Fig. 7 is a sectional view through a corner portion of the casket wherein the outer layers of the end and side panels are first separately formed in accordance with one method of the present invention.

Caskets prepared in accordance with the present invention are constructed essentially or substantially entirely of magnesium oxychloride cement layers reinforced with fibrous reinforcing material, such as woven fabrics and especially loosely woven fabrics of the burlap type. I have discovered that when burlap or other fibrous reinforcing sheet material, which is preferably in loosely woven form, is suitably coated with magnesium oxychloride cement paste, it may be molded into various shapes to form layers or panels having very substantial strength per unit of weight. When a relatively small number of layers are suitably superimposed or plied up to form a unified body, articles, and particularly burial caskets, having very high strength together with relatively low weight may be produced.

In order for the hardened ply material to have greatest strength, I have found it to be essential to first immerse the substantially dry fibrous reinforcing material in a solution of magnesium chloride, which may or may not contain a relatively small amount of magnesium oxide. The fibrous material wetted with the magnesium chloride is then coated with a magnesium oxychloride cement paste, which may be of any desired thickness, such as one-sixteenth of an inch or so.

The magnesium chloride solution in which the fibrous reinforcing material is immersed should preferably have a density of about 25° Bé., although useful results may be obtained when the fibrous material is immersed in magnesium chloride solutions of about 15° to 35° Bé. When the lower density is used, the amount of magnesium chloride in the magnesium oxychloride cement should be greater than when higher density magnesium chloride is used.

When the fibrous reinforcing material is simply wetted with water, or when the wet or dry material is simply immersed in a magnesium cement paste which does not contain a large excess of magnesium chloride, I have found that the bond between the fibrous reinforcing material and the magnesium cement is faulty and usually of insufficient strength. This is believed to be for the reason that unless the fabric is previously wetted with magnesium chloride solution, penetration of the cement into contact with each of the fibers is not obtained. Also, when the burlap or reinforcing material is first wetted with magnesium chloride solution, warping of articles formed from the ply material is reduced considerably.

Caskets formed in accordance with the present invention may have a substantially boxlike bottom portion 1 and a suitable coacting cover portion 2, both of which comprise essentially ply material, such as that of layers $a_1$, $a_2$, $a_3$, etc., in the drawing. Each of the layers consists of a fibrous reinforcing sheet, such as burlap 12, which has been soaked in a solution of magnesium chloride and which contains outer adherent coatings 13 of magnesium oxychloride cement applied to the fibrous material as above set forth.

The boxlike bottom portion may have suitable side portions 3 and end portions 4, and a bottom 5 integrally united to form a one-piece structure. The boxlike bottom portion preferably contains suitable spaced fastening and reinforcing elements, such as wooden strips 6 and 7, which may be enclosed between the layers of the above described ply material or adhered to the cement. The strips 6 and 7 are disposed around the periphery of the upper edge of the box and around the periphery of the bottom portion 5, respectively. The peripheral strips 6 are desirable to serve as a base for hinges (not shown) between the cover and the bottom portion and also as a base to which any desirable lining may be tacked or otherwise fastened. Handle fastening means, such as wooden reinforcing strips 8, are also preferably inserted in the vicinity of the handles 9 to strengthen the walls of the casket at the points where the handles are attached.

The cover 2 also consists essentially of a plurality of layers of magnesium oxychloride cement reinforced with fibrous sheet material and contains suitably spaced, tack-receiving fastening and reinforcing elements, such as the wooden strips 10 and 11 for the lining, not shown. The peripheral fastening strips 10 of the cover are preferably disposed between the layers of the ply material and may also serve as hinge supporting elements for the cover.

In forming a casket in accordance with the present invention, the outer plies of the casket may be shaped in a relatively inexpensive sheet metal mold, such as that illustrated in Fig. 5. The mold comprises sheet metal members, such as side members 15 and 16 fastened together with suitable bolts 17, which may be removed so that the mold may be disassembled and the casket removed. If it is desired to produce caskets having rounded corners, corner blocks 18 may be used in the forming mold.

The mold may conform to any desired configuration, and in the preparation of caskets it is first coated with a suitable grease, or other adhesion-preventing material. The ply material, $a$, consisting of the fabric layer 12 and coatings 13 of magnesium oxychloride paste of the desired thickness may be simply pressed or rubbed by hand into complete conformity with the mold contour. If only a panel mold, such as that illustrated in Fig. 6, is used one or more layers of the ply material pressed in conformity with the mold 20 may be allowed to harden to produce thin outer plies $a_1$ in the form of panels 21 having substantial strength. The outer plies thus produced are then assembled to their position in the desired casket, as shown in Fig. 7, and additional plies or layers of plastic ply material are then pressed against the assembled panels 21 with the ends of the additional layers overlapping to form a composite structure. The additional plies are allowed to harden the ends of the outer panels 21. When as illustrated in Fig. 5 a complete unitary structure is formed in a single mold, all of the plies of ply material $a$ may be superimposed to form a composite structure before any of the plies harden.

The reinforcing members, such as the wood strips 6, 7, 8, 10 and 11, above described, are preferably inserted before the inner layer $a_3$ of ply material $a$ is applied so that they are invisible. However, it has been found that wood reinforcing strips may be solidly fastened to the inner surface of the casket by first coating the wood with a solution of magnesium chloride, or with a thin paste of magnesium oxychloride cement containing a large excess of magnesium chloride, placing the wood thus coated in contact with the magnesium oxychloride cement paste 13, and allowing the paste to harden.

Caskets produced in accordance with the present invention are relatively light in weight and are exceedingly strong and weather-resistant. Since the caskets are formed of a plastic ply material, the outer surface may have any desirable contour and it may have a decorative coating 22 to simulate metal or other desired material.

Although several embodiments of the invention have been herein shown and described, it will be understood that numerous modifications of the construction shown may be resorted to without departing from the spirit of my invention as defined in the appended claims.

What I claim is:

1. A burial casket having a boxlike bottom portion consisting essentially of a plurality of superimposed plies of fibrous sheet material having in intimate association with the separate fibers thereof a coating of magnesium oxychloride cement composition, the fibrous material of successive plies being separated by magnesium oxychloride cement and being united together therethrough to form a unitary structure.

2. A burial casket having a boxlike bottom portion consisting essentially of a plurality of superimposed plies of woven fibrous sheet material, each having in intimate association with the separate fibers thereof a coating of magnesium oxychloride cement composition which unites the separate plies in a unitary structure, and spaced wood reinforcing and fastening elements between plies and adherent thereto, the magnesium cement penetrating the spaces of said fibrous sheet material.

3. A process of making burial caskets which comprises preparing a plastic, hardenable ply material by wetting a loosely woven fibrous sheet material with a thin solution of magnesium chloride and then applying a coating of magnesium oxychloride cement paste to said wetted fibrous material; shaping at least one layer of the ply material against panel molds having the contour desired in the outer surface portion of the casket, allowing the shaped ply material to set in the molds to form panels, assembling suitable panels into the relationship to be maintained in the finished casket; applying additional layers of said plastic ply material against said assembled panels, said additional layers overlapping the assembled panels; applying reinforcing and fastening elements in spaced relation against plastic cement of at least one of said layers and allowing the cement of said layers to harden, whereby a relatively light weight, unitary, weather-resistant casket is obtained.

4. A process of making burial caskets which comprises preparing a plastic hardenable ply material by wetting burlap sheet with a thin solution of magnesium chloride of 15 to 35° Baumé and then applying a coating of magnesium oxychloride cement paste to said wetted fibrous material; shaping at least one layer of the ply material against panel molds having the contour desired in the outer surface portion of the casket, allowing the shaped ply material to set in the molds to form panels, assembling suitable panels into the relationship to be maintained in the finished casket; applying additional layers of said plastic ply material against said assembled panels, said additional layers overlapping the assembled panels; applying reinforcing and fastening elements in spaced relation against plastic cement of at least one of said layers and allowing the cement of said layers to harden, whereby a relatively light weight, unitary, weather-resistant casket is obtained.

5. A process of making burial caskets which comprises preparing a plastic, hardenable ply material by wetting a loosely woven fibrous sheet material with a thin solution of magnesium chloride and then applying a coating of magnesium oxychloride cement paste to said wetted fibrous material; shaping an outer layer of said plastic ply material against a lubricated forming mold having substantially the internal contour of an outer portion of the desired casket, successively applying additional layers of said plastic ply material against said outer layer, applying reinforcing and fastening elements against plastic magnesium oxychloride cement of said ply material and allowing the magnesium cement of all layers to harden in situ.

6. A burial casket comprising a boxlike bottom portion formed essentially of a plurality of superimposed layers of pliable fabric reinforcing material adhered together with an adherent coating of magnesium oxychloride cement between each ply.

7. A burial casket having a unitary, boxlike bottom portion comprising essentially a plurality of superimposed plies of loosely woven fibrous material, each having a coating thereon of magnesium oxychloride cement, with suitably spaced reinforcing and fastening means between the plies of said reinforcing material.

8. A method of making burial caskets which comprises forming a plastic ply material by coating a loosely woven fabric reinforcing material with an adherent layer of magnesium oxychloride cement paste having suitable thickness, shaping a layer of plastic ply material to the contour of a suitable forming mold, allowing the layer to harden against said forming mold, and superimposing additional layers of said plastic ply material over the layer substantially in contact with said forming mold, the ends of said superimposed layers overlapping the ends of the layer first applied.

9. A burial casket having a boxlike bottom portion consisting essentially of a plurality of superimposed plies of burlap, each layer having in intimate association with the separate fibers thereof a coating of magnesium oxychloride cement composition which unites the separate plies in a unitary structure, and spaced wood reinforcing and fastening elements between plies and adherent thereto, the magnesium cement penetrating the open spaces of the burlap and contacting the fibers thereof.

MAX SKOLNIK.